United States Patent [19]
Smith, II

[11] 3,908,057
[45] Sept. 23, 1975

[54] FABRIC WITH THIN SURFACE MATRIX AND METHOD FOR PRODUCTION THEREOF

[75] Inventor: Alexander M. Smith, II, Elkin, N.C.

[73] Assignee: The Fiberwoven Corporation, Elkin, N.C.

[22] Filed: Oct. 3, 1973

[21] Appl. No.: 403,059

Related U.S. Application Data

[63] Continuation-in-part of Ser. No. 221,614, Jan. 28, 1972, Pat. No. 3,817,820.

[52] U.S. Cl.............. 428/151; 28/12 FT; 28/72.1; 28/72.2 R; 28/74 R; 28/75 R; 28/75 WT; 428/172; 428/235; 428/284; 428/288; 428/290; 428/300; 428/301; 428/302
[51] Int. Cl.² ........................................... B32B 5/06
[58] Field of Search .......... 161/80, 62, 66, 67, 154, 161/155, 166, DIG. 2; 28/72.2 R, 72 P, 72 FT, 72 CS, 72 NW, 74 P, 75 R, 75 WT, 72.1; 117/28, 111 F; 118/123

[56] References Cited
UNITED STATES PATENTS

| | | | |
|---|---|---|---|
| 3,206,351 | 9/1965 | Smith | 161/154 |
| 3,594,213 | 7/1971 | Rudman | 117/111 F |
| 3,817,820 | 6/1974 | Smith | 161/154 |

*Primary Examiner*—Marion E. McCamish
*Attorney, Agent, or Firm*—Cushman, Darby & Cushman

[57] ABSTRACT

There is provided a textile fabric having a fiber/polymer surface matrix composed of segments of fibers closely packed together in random arrangement. The surface matrix lies substantially parallel to the face surface of the fabric. Fibers having segments thereof in the surface matrix also have segments which are rooted and bound in the body of the fabric. Segments of fibers in the surface matrix are bonded together by polymeric resin disposed essentially only in the surface matrix and being in an amount such that the surface matrix has a predominately fibrous character. In the preferred method, a textile fabric with upstanding fiber segments is moved relative to a thin blade and a viscous polymeric liquid is applied near the nip between the blade and the fabric. Pressure is applied to the blade to mechanically work the upstanding fibers and remove excess liquid from the fabric. Thereafter, the polymeric liquid is set while pressing the face surface of the fabric. The dense, intensely entangled, fiber network classifies the product as a reticular shoe upper material.

50 Claims, 14 Drawing Figures

FABRIC WITH THIN SURFACE MATRIX AND METHOD FOR PRODUCTION THEREOF

This is a continuation-in-part of copending application Ser. No. 221,614, filed on Jan. 28, 1972, now U.S. Pat. No. 3,817,820 entitled NEEDLED TEXTILE FABRIC, the entire disclosure of which is incorporated herein by reference.

BACKGROUND OF THE INVENTION

The aforementioned specification discloses a method and apparatus for producing a novel textile fabric. In a preferred embodiment, textile fibers are needled together into an integral structure with a face surface and back surface and having coherent fiber entanglement. The needled structure has a high overall bulk density and a bulk density gradient in which the bulk density increases from the back surface to the face surface. A plurality of layers of fibers are superimposed on one another, e.g. by carding, to form a web of loosely matted fibers having a needle pick-up gradient which increases in the Z direction, i.e., from the back surface to the face surface. The web is needled until the resulting structure has an overall bulk density of at least 6 pounds per cubic foot, e.g., at least 8 to 12 pounds per cubic foot, and the ratio of the bulk density at the back surface to the bulk density at the face surface is in the range of at least 1:2 to as high as 1:8, preferably 1:3 to 1:5. Also, the fabric has a controlled axis of flexure which lies at least within 0.4, e.g., 0.3 and especially 0.2 or 0.1 of the distance from the face surface to the back surface. Some of the fiber entanglement includes fibers being oriented into closely spaces rows of fiber chain entanglement, the rows extending lengthwise of the structure.

The bulk density gradient may be accomplished by positioning a plurality of superimposed layers of fibers so that the average fiber denier of the layers decreases from the back surface to the face surface. Fiber deniers of ½ to 8, especially to 5 are preferred. Alternately, or in addition, the average fiber length of the layers may decrease from the back surface to the face surface. Fiber lengths of ¾ inch or less up to 4 inches, especially 1 inch to 3 inches are preferred. Further bulk density may be accomplished by laying on the face surface of this first so-needled fabric at least one layer of relatively short, loosely matted fibers (less than 2 inches, e.g., ⅛ to ¾ inch) and then needling the layer of short fibers to increase the bulk density of the structure to at least about 8 pounds per cubic foot.

Preferably, the structure is then relaxed, e.g., mechanically relaxed, to loosen the structure and adjust the modulus thereof. It is further preferred that the structure be further densified by shrinking the fibers at and adjacent to the face surface. The fibers at and adjacent to the face surface are, accordingly, at least in part shrinkable fibers and densification may be accomplished by applying heat or solvents to the face surface. While this product may be used for many purposes, the fabric may be impregnated with a filler to further raise the bulk density of the fabric and provide the higher densities desired for artifical leather. Here again, the impregnated and cured fabric may be used for many purposes without further processing. Alternately, the fabric may be finished by mechanical processes such as buffing, working, sanding and embossing or chemical processes such as adding softeners, sizes or applying a convention leather coat or finish material thereto. The filler is impregnated in the open interstices between the fibers. The filler may be an elastomer in the form of solid particles, especially clusters of particles which are predominately loosely bonded to the fibers. The filler is impregnated in the fabric in an amount insufficient to fill all of the interstices between the fibers. This can raise the bulk density of the impregnated fabric to 20 to 45 pounds per cubic foot.

For producing artifical leather, a conventional leather coating or finish is preferably placed on the impregnated fabric. These coatings and finishes may include, alone or in combination, conventional leather filler coats, base coats, tie coats, decorative coats and lustrous top coats. The polymers of these coatings and finishes may include among others, acrylics, polyurethane, nitrocellulose, cellulose-acetate-butyrate, and the like, all of which are well known in the art. Preferably, the coatings and finishes are applied in quantities such that an impervious coating does not result, e.g., the quantity of coating or finish is in the range of that applied to leather. In the aforenoted application, it is disclosed that the coating can be applied to the needled fabric by any conventional means, such as spraying, dip coating, roll coating or knife coating.

While conventional coatings and finishes of the above-discussed nature can provide aesthetically pleasing appearances to the products of the aforenoted application, especially artificial leather products, large quantities of coating material are frequently required when applied by conventional processes in order to provide the desired appearance. However, large quantities of coatings and finishes do not provide good flexure, moisture transmission, scuff and abrasion resistance and ease of repairing scuffs.

A considerable advantage would be provided by a surface on the fabric which exhibits surface properties similar to leather. However, surfaces and methods of producing surfaces of this nature were not known in the art.

OBJECTS OF THE INVENTION

It is therefore an object of the present invention to provide a method and apparatus for obtaining a surface on textile fabrics which provides properties similar to leather. It is another object to provide such surfaces while also preserving the porosity of the fabric. Another object is to improve the scuff resistance of coatings and finishes placed on the fabric. It is a further object to provide the foregoing in connection with the needled textile fabrics of the parent application. Other objects will be apparent from the following disclosures and claims.

BRIEF DESCRIPTION OF THE INVENTION

Toward obtaining the foregoing objects, the parent application discloses a novel surface treatment which is performed prior to the application of a conventional leather coating or finish. The face surface of the body of the fabric provides a plurality of relatively short upstanding fibers where a segment of the individual fibers is rooted in the body of the fabric and another segment of the individual fibers projects or protrudes therefrom. A viscous liquid polymer composition capable of polymerization and/or otherwise setting, e.g. solvent evaporation, is applied to the surface in a manner to coat the upstanding fibers but not to substantially penetrate into the fabric. After the polymer composition has reached acceptable conditions of setting and/or polymerization, etc., the fibers on the surface of the fabric are pressed in directions parallel to the surface of the fabric and the polymer composition coating the fibers is coalesced, with or without further polymerization and/or setting, to form a surface matrix which has fibers randomly arranged in directions parallel to the surface of the fabric and bonded together. The surface may be then further set, polymerized, cured, etc.

It will be appreciated from the above that fiber segments of the surface matrix are rooted in the body of the fabric structure and firmly anchor the surface matrix to the fabric while the pressing step closely packs the fibers in the surface matrix and results in a dense surface matrix which is characterized by its fibrous nature. That is to say, the surface matrix has a multitude of bonded, interlocked and entwined fibers, in the nature of leather, which provides exceptional properties to the surface of the fabric. The surface matrix enables an aesthetically pleasing and physically strong surface to be obtained without the application of excessively thick polymer films or large amounts of coating and finishing materials. Since there is no thick polymeric film or large amounts of coating, which can peel or crack, the difficulties associated with conventional coated artificial leather are obviated. Also, the surface matrix may form a base for conventional leather coatings or finishes and the surface matrix, therefore, "ties" conventional leather coatings or finishes to the surface of the fabric. In this sense, the surface matrix was referred to in the aforenoted parent application as a "tie coat," although this is not the more usual sense of the expression, as will be further explained hereinafter.

The polymer used in the surface matrix must be bondable to the fibers of the fabric and bondable to conventional coatings or finishes applied thereto. Additionally, when the finished fabric is intended to be embossed, as in the case of artificial leather, the polymer of the surface matrix must be capable of being molded or formed. Beyond these, essentially, physical properties, the particular polymer or the chemical composition thereof is relatively non-critical. This is especially true for an embossed, artificial leather surface matrix, since the surface fibers thereof generally have greater strength than the polymer and thus the fibers provide the more important properties for the artificial leather, including snag and scuff resistance. The polymer of the surface matrix therefore serves to retain and bond the surface fibers in the pressed configuration. It can be seen that the polymer, as applied, need not be a continuous film, or be contained on the surface in large amounts, as compared with the fibers. Relatively small amounts of polymer are sufficient so long as the surface fibers are retained and bonded in the embossed or pressed configuration. Usually the amounts of polymer should be insufficient to substantially adversely affect the porosity of the fabric. Thus, the preferred amount of polymer applied to the surface of the fabric is at least that amount which will bond the surface fibers in the embossed or pressed configuration.

From the above, it also can be appreciated that an important aspect of the invention is disposing the polymer of the surface matrix essentially only on the surface of the fabric and particularly on the surface fibers. The polymer should not be substantially disposed within the fabric itself. If significant amounts of polymer are disposed within the fabric, an unacceptable boardy feel and other loss of desirable fabric properties will result. Thus, the particular method of applying the polymer is of primary importance.

It will also be appreciated that an equally important aspect of the invention is the surface to which the polymer is applied. The fabric surface must provide a multitude of relatively short upstanding fibers, each fiber of which has a segment solidly anchored or rooted in the body of the fabric and a segment of which is free to be engaged by the polymer so as to be formed into the surface matrix.

DETAILED DESCRIPTION OF THE INVENTION

As disclosed in the aforementioned parent application, the polymer is applied to the surface of the fabric and is referred to by the expression tie coat. In the more usual sense of the expression, a tie coat is a coating which is intermediate between a substrate and an overcoating and serves to adhere the overcoating to the substrate. While this function may be performed by the present surface matrix and hence in that sense is a tie coat, that is not the primary purpose of the present surface matrix. Indeed, no additional coating or finishes are necessarily applied to the present fabric after the surface matrix has been formed, since the resulting product is quite suitable for many applications without any additional coatings or finishes. For example, when the surface matrix is formed with a relatively clear polymer on a previously dyed fabric, the product has the appearance of "analine" finished leather, without further finishing or coating. Alternately, the surface may be acted upon in differential manners such as by solvents, dyes, pressures and abrasive devices for producing surface designs, either patterned or random.

According to a preferred method, the polymer is applied to the fabric surface by way of a thin blade which has a pressure applied thereto during application of the polymer. The present surface matrix is produced when the present fabric is heated and pressed after application of the polymer by the above particular method. Thus, the method of application of the polymer and the nature of the fabric surface are of primary importance and will be discussed in detail hereinafter.

Many methods are disclosed in the art for disposing liquids as a continuous film or coating on and/or impregnating in conventional fabrics to provide special properties, such as rendering the fabric waterproof, water repellant, crease resistant, permanently pressed, and the like. These methods include the use of sprays, pads and nips, brushes and rollers, blades and the like. Thus, for example, U.S. Pat. No. 3,594,213 to Rudman describes a method for applying a viscous polymeric liquid to a conventional, woven, textile fabric to impregnate and/or coat the fabric. In that method, a doctor blade causes penetration of the viscous liquid into the woven fabric by reason of the dynamic pressure caused by the geometry of doctor blade and the viscosity of the liquid. These prior methods, however, are not acceptable for providing the presently required disposition of the polymeric liquid because of the different nature of the surface of the present fabric. For this reason, the nature of the surface of the fabric will be considered first.

As noted above, the surface of the fabric must have a multitude of relatively short, upstanding fibers projecting therefrom. This concept can be understood by reference to a preferred embodiment where the fabric surface is a "cut" surface. A cut fabric is defined as a fabric wherein fibers on the surface of the fabric have been severed so that a multitude of relatively short fibers are rooted in the body of the fabric and have a free end which generally upstands from the body of the fabric. The cutting method must be such that substantial numbers of longer fibers are not on the fabric surface after the cutting operation. Thus, the cutting operation should not be of a nature which tends to pull relatively longer fiber ends from the face surface of the fabric, e.g., napping, or such an operation must be followed by a subsequent operation to cut the longer fibers to short fibers, as defined. In the preferred embodiment, longer fibers are substantially avoided by severing the fibers in a plane substantially parallel to the plane of the fabric. While the particular means of cutting or severing the fibers are not critical so long as a cut fabric of the foregoing characteristics is produced, the fabric is suitably cut by shearing, splitting, sanding, abrasively buffing and the like, all of which can sever the fibers and produce a multitude of upstanding fiber ends at the face surface of the so-cut fabric. Of course, in the case of splitting, the fabric may be split through the middle thereof to produce two separate fabrics, each with a cut face, or a plurality of splitting steps may be used to produce a plurality of cut fabrics, each with at least one cut face.

In one aspect of producing a cut fabric with the short upstanding fiber ends, the fibers in the body of the fabric should be sufficiently bound to each other that substantial numbers of fibers will not be pulled from the fabric during the cutting operation. The fibers may be mechanically bound, e.g., by weaving, twisting, knitting, needling, etc., and/or adhesively bound, e.g., by fillers, chemical binders, melt bonding, solvent bonding, etc., all of which are well known in the art. Preferably the fibers of the fabric will be at least bound mechanically, that is, oriented in such a manner that the friction between fibers will prevent pulling of fibers from the fabric. In mechanically bonding the fibers, the overall bulk density of the fabric is important. Thus, higher overall densities of the fabric will provide improved mechanical locking of the fibers. These higher overall bulk densities can be obtained by any of the conventional means, such as very tight weaving, complex felting, knitting, heat or solvent shrinking of woven or non-woven fabrics and needling, or combinations of the foregoing. Both mechanical bonding and adhesive bonding of the fibers are preferred.

Thus, in the present specification and claims, the term "bound" fibers is intended to reference either mechanically bound or mechanically and adhesively bound fibers in the body of the fabric. The "body" of the fabric is defined herein as the structural part of the fabric where the fibers are bound, as described above, and from which the upstanding fiber ends protrude. Also, the body of the fabric is of much higher bulk density than the surface portion of the fabric, constituted by the upstanding fiber ends.

Also, as noted above, the viscous polymeric liquid must be disposed so as to coat the upstanding fibers but not to substantially penetrate into the fabric so that the surface matrix can be made without rendering the fabric stiff, boardy or non-porous. The process to accurately place the polymeric liquid on the present fabric surface is also of primary importance.

The principles of the process can be understood by reference to a preferred embodiment thereof. In this preferred embodiment the viscous polymeric liquid is disposed on the surface of the fabric and a relatively thin blade mechanically works and scrapes the upstanding fibers. This scraping or smearing action causes the viscous liquid to rapidly wet the upstanding fibers and also removes "excess liquid" from the upstanding fibers before the viscous liquid can substantially penetrate into the body of the fabric. It should be understood, however, that polymeric liquid may coat the surfaces of the fibers disposed in the upper surface of the body of the fabric. Indeed, coating of these fibers is often desirable, since those surface fibers can therefore more effectively participate in the formation of the surface matrix. Further, any filler (such as the latex filler of the parent application) disposed on the surface of the fabric may also have polymeric liquid thereon. Therefore, the definition of "excess liquid" is not intended to include that liquid coating the fibers or filler at the upper surface of the body of the fabric. On the other hand, since the amount of viscous liquid between and bridging the upstanding fibers could be more than sufficient to establish a relatively complete or continuous coating or film on the face surface of the fabric, which is not desired, the blade must act on the liquid to remove the excess liquid beyond that required to coat the surface of the upstanding fibers and the filler and fibers at the upper surface of the body of the fabric. In some cases, it is desirable to have a filler disposed in the upper surface of the body of the fabric since this may assist in preventing the viscous liquid from penetrating into the body of the fabric. Generally, add-ons of viscous liquid (exclusive of volatile solvent) to the fabric of at least 0.5 gram per square foot, especially at least 1.5 grams and up to 12 grams per square foot, especially up to 6 grams per square foot are satisfactory. Within these ranges, for most fabrics, the excess liquid will have been removed.

It has been found that in order to accomplish the foregoing, several conditions must be observed. First, pressure must be applied by the thin blade to the fabric and hence to the upstanding fibers and upper surface fibers on the body of the fabric. This pressure should be at least ½ pound per linear inch of the blade. Secondly, the application of viscous liquid to the fabric and the subsequent action by the blade must be sufficiently close in time as to not allow the viscous liquid to essentially pass through the upstanding fibers and surface fibers and penetrate into the body of the fabric. With viscous liquids and fabrics generally envisaged by the present invention, it is preferred that the blade act on the viscous liquid and fibers within 1 minute, especially within 30 seconds and preferably within 10 seconds after application of the liquid to the fabric. A satisfactory time period, in this regard, is from 0.1 to 5 seconds. Accordingly, the point of application of the liquid to the fabric and the speed of relative movement between the fabric and the blade next scraping the liquid should be so adjusted so that the next blade scrapes the fabric within the foregoing periods. Further, since a relatively non-viscous liquid could very rapidly pass through the upstanding fibers and penetrate into the body of the fabric, the present process requires that the liquid be somewhat viscous. For purposes of this preferred embodiment of the invention which utilizes the thin blade, it is preferred that the viscous liquid have a viscosity of at least 2,000 cp and more preferably at least 8,000 to 10,000 cp. Satisfactory viscosities are between 10,000 and 14,000 cp. e.g., 12,000 cp, but viscosities up to 25,000 cp, e.g., 20,000 cp may be used.

Thus, from the above it can be seen that to accomplish the objects of the invention, a textile fabric surface must provide a plurality of relatively short fibers, wherein a segment of individual fibers protrudes and upstands from the body of the fabric and another segment of the individual fibers is firmly rooted and bound in the body of the fabric. Relative movement between the fabric and thin blade in contact with the surface of the fabric is caused so that there is a resulting vector of movement between the fabric and the blade. A viscous liquid is applied to the surface of the fabric prior to the point where the blade contacts the fabric. A force is applied to the fabric by the blade which causes the upstanding fibers to be mechanically worked. The viscous liquid is thereby caused to wet and coat surfaces of the upstanding fibers and surfaces of the upper surface fibers (and filler, if present at the surface of the fabric), and excess liquid, i.e. liquid in excess of that required to coat surfaces of the upstanding fibers and surfaces of upper surface fibers (and filler of the surface if present), is removed from the fabric by action of the blade. The point of application of the viscous liquid to the fabric and/or the rate of movement of the fabric are so adjusted that the viscous liquid does not substantially penetrate into the body of the fabric. Thereafter, the viscous liquid is caused to set, e.g., by polymerization, solvent evaporation, curing, cross-linking, etc.

The blade may have any desired shape or orientation with respect to the fabric so long as the shape or orientation does not create substantial dynamic or hydraulic pressure on the viscous liquid, which would cause substantial penetration of the liquid into the body of the fabric. Thus, the blade may have, for example, a square, rounded, elliptical or wedge shaped contact tip but substantial hydraulic pressure producing contact tips, e.g., wedge angles of 45° or less, formed by the blade with the plane of the fabric, should be avoided. Also, to prevent undue drag and unnecessary hydraulic pressure, the contact edge of the blade should be relatively thin, e.g., no more than ⅛ inch in width. Further, to prevent hydraulic pressure and to assure a smooth passage of the fabric pass the blade, it is preferred that the blade is either perpendicular to the plane of the fabric or inclined slightly to the plane of the fabric in a direction opposite to the vector of movement of the fabric.

The blade is loaded with between ½ and 10 pounds per linear inch of the length of the blade, especially between about 1 and 7 pounds per linear inch. The load on the blade must be sufficient to cause the blade to essentially contact the upstanding fibers and the surface fibers and to prevent the blade from "hydroplaning" on the viscous liquid. By hydroplaning, it is meant that the blade rides or floats on the viscous liquid rather than scraping excess liquid from the fibers.

The amount of viscous liquid initially applied to the fabric is such that a substantially continuous pool of liquid is maintained on the surface of the fabric at the nip formed between the fabric and blade. Preferably, the depth of the pool of viscous liquid is sufficient to insure that there is always enough viscous liquid present at the blade to cause the required wetting and coating of the surfaces of the upstanding fibers and the upper surface fibers.

The apparatus for performing the preferred method of the invention includes a means for providing a multitude of upstanding fibers on the surface of the fabric, e.g., by cutting the fabric, means for positioning the blade relative to the fabric so that the tip of the blade contacts the surface of the fabric, a loading means for applying a load on the blade, and hence on the fabric (mechanical, hydraulic or pneumatic loading means), a moving means for causing relative movement between the blade and the fabric (any conventional drive mechanism such as belts, rolls, wheels, etc), and a viscous liquid supply means for applying the viscous liquid near the nip formed between the fabric and the blade (conventional distribution devices or the viscous liquid can be applied from a suitable container by hand).

DETAILED DESCRIPTION OF THE DRAWINGS

Figure 1:
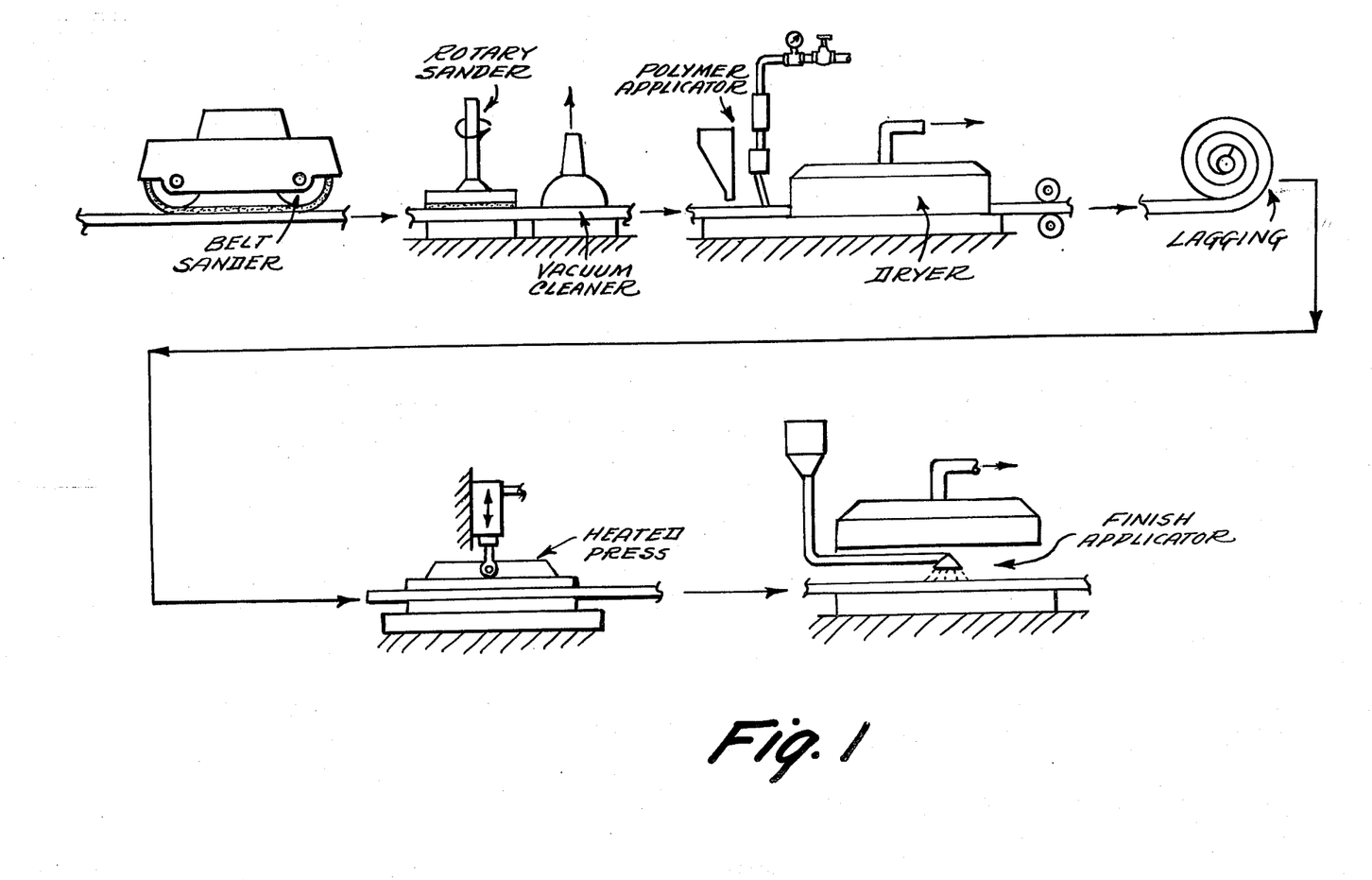
FIG. 1 is a schematic illustration of a typical embodiment of the overall process of the invention.

Turning now in detail to the drawings, the invention may be briefly described in connection with FIG. 1.

As illustrated in that drawing, a preferred embodiment of the process is where the face surface of the fabric is cut by abrading devices, e.g., a belt sander and rotary sander, which produces the upstanding fibers on the face surface. A vacuum cleaner may remove any cutting dust, etc. The viscous polymeric liquid is applied to the cut surface, and solvent, if used in the liquid, may be at least partially driven off in the dryer. Or the heat of the dryer may be used to at least partially cure or polymerize the viscous liquid and/or the fabric may be lagged (allowed to dwell for a period of time) to accomplish the same result. In any event, the viscous liquid is set so that it is no longer substantially mobile on the fabric at ambient temperatures. At this point, the surface matrix is formed by heat and pressure with any conventional heated press. The heat and pressure should be sufficient to depress the upstanding fibers and form them into a relatively planar, entwined arrangement. Of course, one of the press platens or both may have a surface pattern which functions to also emboss the surface of the fabric during the pressing operation. In the pressing step the surface fibers are bonded in this configuration to form the surface matrix by further setting, e.g., curing or polymerization, of the viscous liquid (now solidified). Suitably, a finish is then applied to the surface matrix and/or the body of the fabric.

Figure 2:
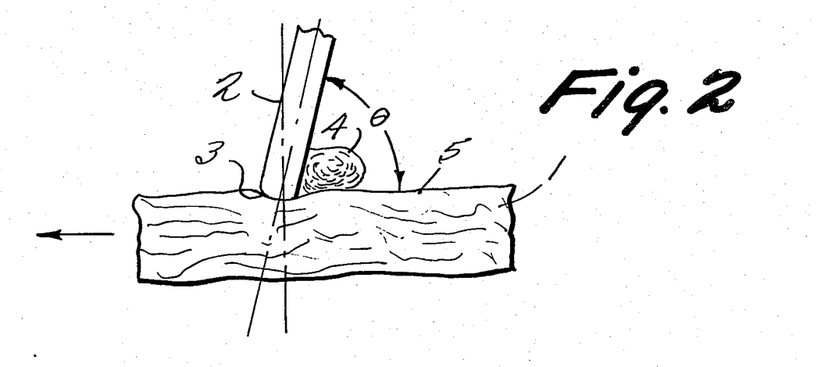
FIG. 2 illustrates how the blade acts on the fabric.

FIG. 2 illustrates the action of the blade on the fabric. In that Figure, fabric 1 is in contact with the blade 2 which blade may be perpendicular to the fabric or inclined to the fabric. It is preferable that the blade be inclined at an angle $\theta$ to the fabric. The blade is inclined to the fabric in the direction opposite to the relative movement of the fabric. The blade may have an elliptical, circular, triangular, rectangular or rectangular tip so long as dynamic and hydraulic pressure on the viscous liquid is not intensified. The pressure between the blade and the fabric may vary from as little as ½ pound per linear inch to as high as 10 pounds per linear inch, and the pressure will vary somewhat with the thickness of the blade and the precise shape of contact tip 3. However, for convenient sized blades having thicknesses of from 1/32 to ⅛ inch, pressure of between ½ to 7 pounds per linear inch of the length of the blade, especially between about 1 and 5 pounds per linear inch are preferred. The foregoing pressures are considered as pressures measured at the juncture of the contact tip of the blade and the fabric. Thus, where the blade rests on the fabric, as shown in FIG. 2, the weight of the blade and any supporting or holding jig must be taken into account in addition to any positively applied pressure, as discussed more fully hereinafter.

The blade or the fabric or both may be moved relative to the other to create a vector or movement in a direction opposite to any angle of inclination of the blade. Thus, if the blade is stationary, with respect to the longitudinal (lengthwise) direction of the fabric, then the fabric is moved in a direction opposite to the direction of the angle of inclination of the blade, as indicated by the arrow in FIG. 2, and referenced herein as the forward direction. However, the blade may be moved relative to the surface of the fabric in a direction opposite to the arrow, referenced herein as the backward direction. In this case, the addition of the movement of both the fabric and blade in distance per time, e.g., inches per minute, will give the resulting vector of movement. On the other hand, if the blade is also moved in the forward direction, the difference between the movement of the fabric and blade will give the resulting vector of movement.

The liquid is applied to the fabric in a sufficient amount, either in increments or continuously, so that a substantially continuous pool of viscous liquid 4 is maintained on the surface 5 of the fabric at the nip formed between the fabric and inclined side of the blade, as illustrated in FIG. 2. The pool of liquid should be maintained on the fabric at a depth sufficient to at least wet the fabric surface at the contact point of the blade.

The particular relative movement of the fabric and blade can vary widely depending mainly on the viscosity of the liquid. However, for most cases, relative movements of at least about 1 foot per minute will be required and more often at least 5 to 30 feet per minute. Of course, much greater relative movements, e.g., up to 50 or even up to 100 feet per minute may be used.

Figure 3:
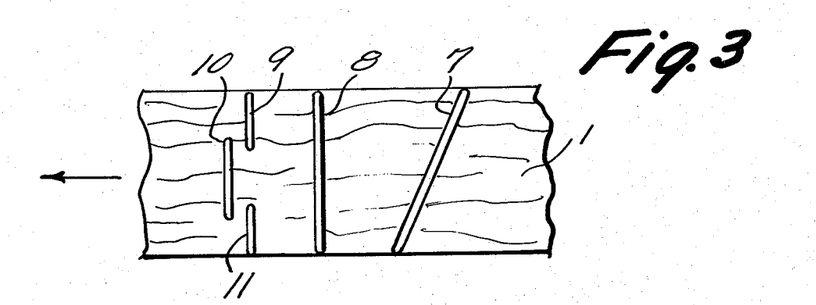
FIG. 3 illustrates the use of blades arranged in various fashions on the fabric.

The disposition of the blade relative to the transverse direction of the fabric is not critical. Thus, as illustrated in FIG. 3, the blade may be disposed on the fabric 1 at an angle to the transverse direction, preferably a relatively small angle as illustrated by blade 7. Of course, the blade need not be at any transverse angle, as illustrated by blade 8. Additionally, it is not required that the blade be of a unitary structure and may be composed of a plurality of individual blades, such as illustrated by blades 9, 10 and 11. In this case, the blades act in conjunction to function in the same manner as blades 7 or 8.

Figure 4:
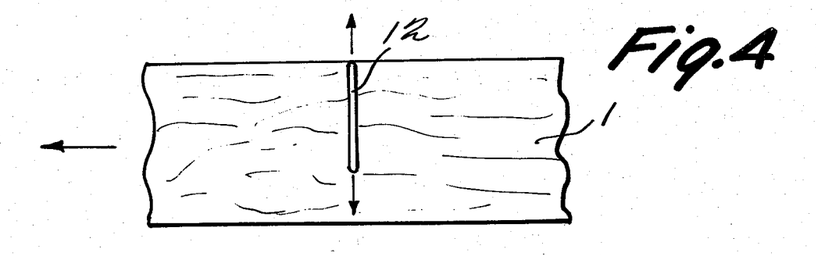
FIG. 4 illustrates an additional transverse motion of a blade.

Further, the blade may be moved transversely to the direction of relative movement of the fabric, as illustrated in FIG. 4, where blade 12 is moved transversely, as indicated by the arrows, as fabric 1 is moved thereunder.

Figure 5:
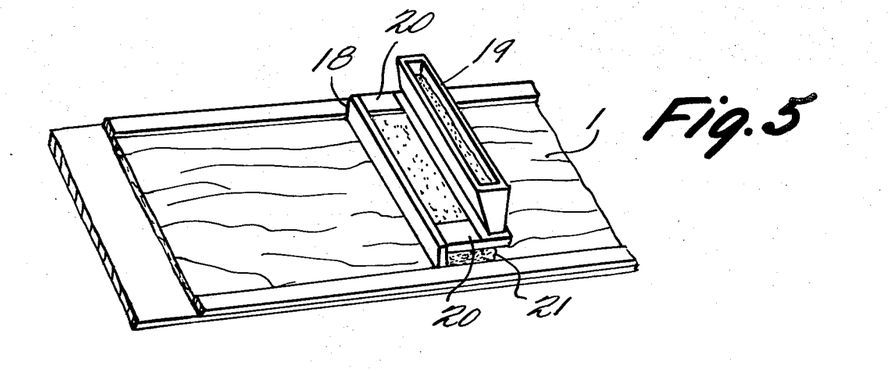
FIG. 5 illustrates a means of supplying viscous liquid to the fabric.

As shown in FIG. 5, the blade 18 may be attached to a reservoir 19 by way of suitable supports 20. The reservoir contains the viscous liquid, which is applied to the fabric in a stream 21 exiting from a slot in the bottom of the reservoir. The slot may be a metering slot which supplies the correct amount of liquid when a relatively constant head is maintained on the liquid. The blade may be pressed on the fabric 1 in any manner desired (specific means not being shown). However, any suitable metering device for placing the correct amount of liquid on the fabric may be used, as desired, and indeed, hand application is quite suitable.

Figure 6:
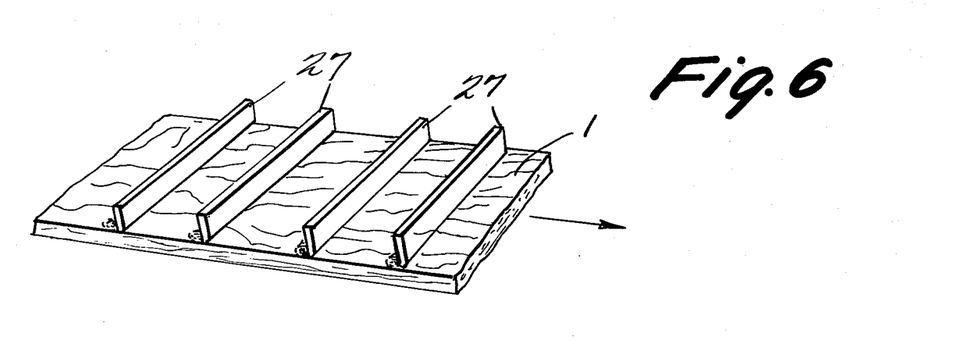
FIG. 6 illustrates the use of a plurality of blades to apply a plurality of forces and/or viscous liquids to the fabric.

A plurality of single blades may be used, as illustrated in FIG. 6. In that Figure, fabric 1 has disposed thereon a plurality of blades 27, each may be supplied with liquid for application to the fabric (the means for supplying the viscous liquid not being shown) or some may be used for mechanical working only. This arrangement has the special advantage in that differing amounts of liquid or different components thereof may be applied by different blades. Or different solid contents, solvents, etc., may be used in the different specific liquids applied by the various blades. Likewise, different pressures may be applied by each of the blades.

Figure 7:
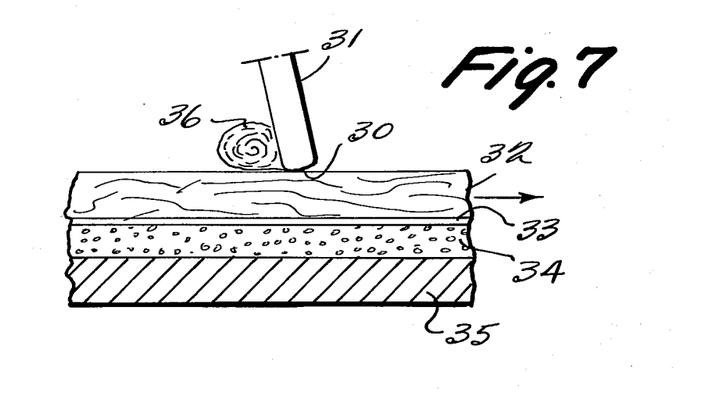
FIG. 7 is an illustration of a resilient support for the fabric being contacted by the blade.

Since the fabrics may have somewhat irregular thicknesses due to manufacturing variations, it is convenient to provide a resilient pressure support disposed next to the side of the fabric which is not being contacted with the blade. This arrangement is illustrated in FIG. 7 where 30 is the contact tip of blade 31 in a pressure relationship to fabric 32. Fabric 32 slides over antifriction sheet 33 (Teflon) covering the resilient pressure support 34, illustrated as foam rubber, which is affixed by any desired means to support 35 which may be simply a steel plate. This arrangement allows for relatively uniform pressure between contact tip 30 and fabric 32, and thus relatively uniform disposition of liquid from pool 36.

Figure 8:
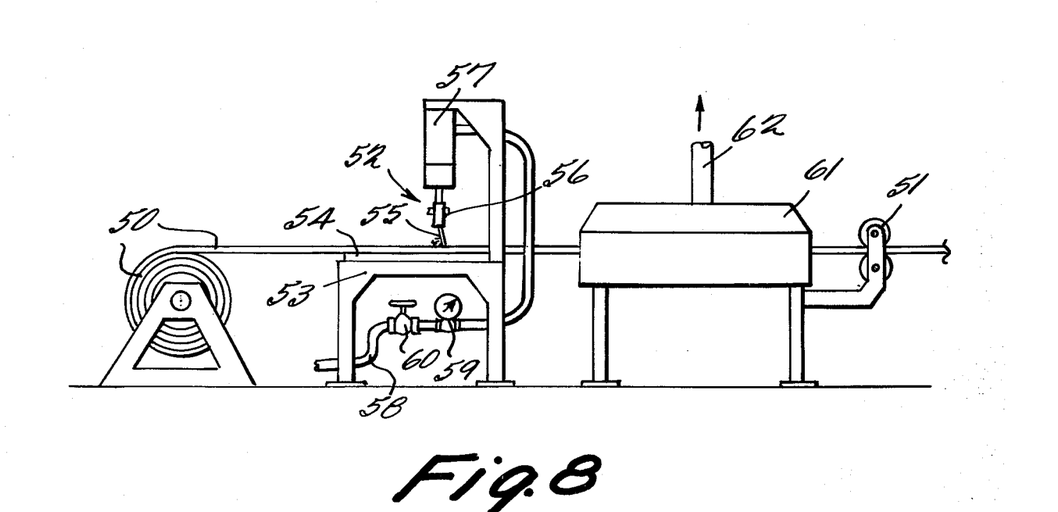
FIG. 8 is an illustration of a suitable overall apparatus for applying the viscous liquid to the fabric.

As an illustration of an overall apparatus for applying the liquid, FIG. 8 shows, in schematic form, a convenient arrangement. In that Figure, a supply of fabric 50 is fed by any suitable means, such as rolls 51, to a liquid application station 52. The station has a pressure support 53 which carries a resilient pressure support 54 (foam rubber with an anti-friction sheet) and blade 55. The blade 55 is held by jig 56 and pressure is applied between the fabric and blade by means of a pneumatic cylinder 57, the piston of which is urged toward the fabric by pneumatic fluid supplied by a source (not shown) through conduit 58. The pressure is controlled to a predetermined level, as indicated on gauge 59, by adjustable reducer valve 60. For simplicity sake, in this embodiment, the liquid is applied from a suitable container by hand to the fabric at a point just prior to where the fabric contacts the blade. The fabric with the liquid thereon enters enclosure 61 which contains conventional quartz-tube heaters (not shown) to heat the liquid and set the same. Vaporized solvent from the liquid is exhausted from the enclosure by conduit 62 and an exhaust blower (not shown).

The unique character of the product which results from the above described process may be further appreciated by considering the mechanism of embossing the product. In conventional artifical leather, surface grains are molded on thick polymeric surface films by embossing with a hot engraved plate which causes the polymer to soften and flow. Since the present fabric has not thick polymeric film thereon wherein surface grains may be molded, but has a fibrous surface, the embossing pressures must cause movement and slippage of the fibers disposed in the surface and thereunder. In effect, this movement and slippage of fibers relative to one another causes a permanent new configuration of fibers in the fabric and is similar to the effect of lasting of the artificial leather, as described in the parent application. The slippage of fibers during graining could, therefore, be conceived as a "mini-lasting."

Figure 9A:
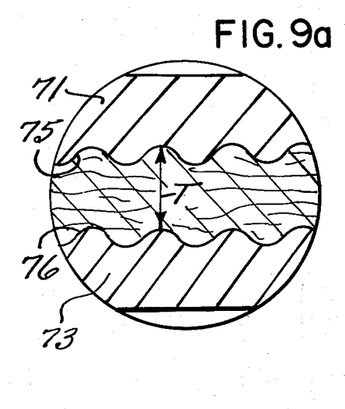
FIG. 9 is an illustration of a suitable press arrangement with pressed fabric therein.
Figure 9B:
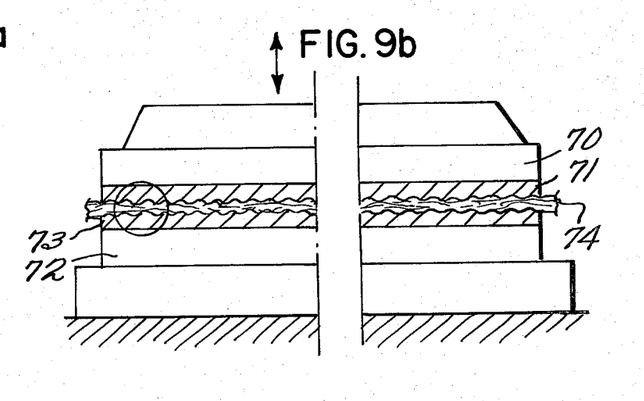

The concept of embossing by slippage of fibers can best be understood by reference to FIG. 9 which shows, in diagrammatic form a typical embossing press. In that Figure, upper press platen 70 has a male metal embossing plate 71 attached thereto (conventional means of attachment not shown). Lower press platen 72 has corresponding female embossing bed 73 disposed thereon. The fabric 74 (with the surface matrix side adjacent plate 71) is disposed between male plate 71 and female embossing bed 73. As shown in the enlarged section, the grain embossing surface 75 of embossing plate 71 has a duplicate female image on the upper surface 76 of female embossing bed 73. By this arrangment, the embossing of a grained surface in febric 74 does not require that any portion of the fabric be substantially reduced in thickness "T". The embossing bed 73 is made by pressing metal plate 71 against a blank bed to form the female image of male plate 71. Thus, the bed must be made of a formable material, but not an elastomeric material. For example, the bed may be a fibrous material, e.g. wool felt, wood pulp board, or cotton felt. Alternately, the bed may be made by pressing and heating a filled sheet of silicone rubber, polysulfide rubber or compounded rubber to cure the same into a relatively non-elastic embossed matt.

Figure 10A:
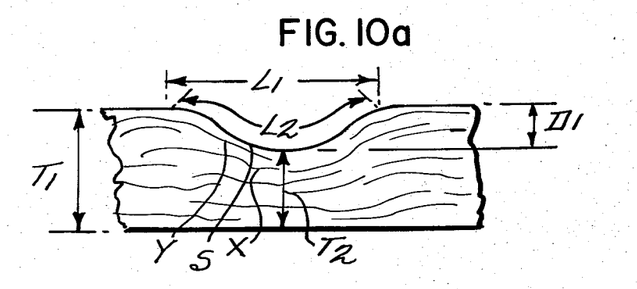
FIG. 10 diagrammatically illustrates an advantage of the press of FIG. 9.
Figure 10B:
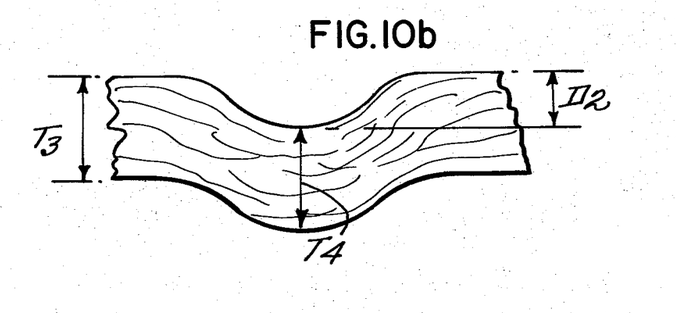

The effect on the fibers of the fabric where the grain is embossed is shown in drawings of FIG. 10. Illustration A shows the cross section of a fabric which has been embossed in the manner of FIG. 9 except with a flat lower platen surface. The length of an embossed grain is indicated by $L_1$ and the length of the embossed grain surface as $L_2$. Of course, before embossing $L_1 = L_2$. During embossing, fibers in the same essential planes under the grain area are slipped relative to each other and the thickness of the fabric under the grain area is reduced from original thickness $T_1$ to grain area thickness $T_2$. This produces a permanent despression $D_1$ (somewhat exaggerated to show the principle). Since the present fabric has a high overall bulk density it can not be readily reduced in thickness without slippage of fibers. Thus, for example, fiber X would slip relative to fiber Y, in the same essential plane, in a direction somewhat parallel to the direction of surface S and cause a permanent reduction of the thickness $T_2$.

However, by using the male/female embossing surfaces of the press of FIG. 9, deep embossing simulating deep grained leathers, e.g. alligator leather, may be obtained without substantial thinning of the thickness of the fabric, but with fiber slippage, as shown in illustration B. A deep grained embossing can be obtained on the present fabric since there is no restraining woven fabric or the like connected thereto. Generally the surface matrix of the present fabric will be formed simultaneous with embossing; if it is formed previously by plating (pressing) the embossing should be carried out before the polymer of the surface matrix is cured or cross linked so that it will not interfere with the embossing. Illustration B shows that the male/female embossing surfaces allow deep graining of the embossed surface, $D_2$, while still providing that the ungrained area thickness $T_3$ is substantially the same as the grained area thickness $T_4$. This is possible because of the slippage of fibers, according to the present embossing mechanism, and as opposed to conventional artifical leather embossing mechanisms.

As noted above, the embossing step grains the surface of the fabric and at least partially cures the polymer of the surface matrix. Accordingly, the temperature and time of the embossing step should be consistent with accomplishing at least this partial cure. For example, temperatures of between 150°F and 400°F for as little as 10 seconds up to 3 minutes may be used, e.g., 20 seconds. At pressures of between 25 and 500 psi on the platens, these times and temperatures are practical ranges of conditions for setting urethane polymers which are the preferred polymers for the surface matrix. It will be appreciated that the cured surface matrix, by bonding fibers after they have been configured by the action of the embossing plate, gives permanence to the embossed grain. It should also be noted that at the higher temperatures and times, filler material in the fabric, e.g., the latex rubber of the parent application, while not bonding the fibers as initially deposited, may soften and be changed under the influence of heat from the embossing plate in such a manner as to bond the fibers near the fabric surface and thus aid in permanently retaining the embossed grain. To assist in effecting this bonding by the filler near the surface of the fabric, a solvent or plasticizer for the filler may be lightly applied to the surface of the fabric prior to pressing. Of course, where thermoplastic polymers are used in the surface matrix, simply holding the embossed fabric in the press until the polymer cools below the solidification temperature, will "set" or "cure" the polymer of the surface matrix. A wide variety of polymers may be used in the surface matrix, either at 100 percent solids or diluted with a solvent or plasticized as desired. Suitable polymers include polyurethane (a preferred embodiment), polyvinyl chloride, plasticized epoxies or oil extended epoxies, polyolefins (e.g. polyethylene and polypropylene), polycarbonates, polyacrylates, nylons, curable polyesters, etc.

The invention can better be understood by way of specific examples which follow but is is understood that the invention is not restricted to the examples but is applicable to the foregoing disclosure.

EXAMPLE 1

As described in Example 1 of the aforenoted parent application, a mat of staple polyester fibers (1 ½ to 5 denier and 1 ½ to 3 inches crimped length) was needled in FIBERWOVEN looms with 1-16-4C or-3C needles (1-barb-16 mil triangular blade-4 or-3 mil barb depth) until a density of about 8 pounds per cubic foot was reached. The fabric was then saturated with a needling fluid composed of a 6 percent solids, water solution of an amine salt of coconut fatty acids (Penetrant GWX, Woonsocket Color and Chemical Co.) and further needled until a density of about 14 pounds per cubic foot was reached. Altogether the fabric was needled about 22,000 needle punches per square inch.

The needled fabric was washed in clean water to remove the needling fluid and squeezed to remove the wash water therefrom. The fabric was heated with an open flame and dried at temperatures less than 250°F.

In order to correct the out-of-balance modulus and to relax the needled fabric, the fabric was passed through a series of six nips formed between six pairs of rolls. One roll of each pair had a grit impregnated rubber surface and the other roll of each pair carried carding wire on its surface. The peripheral surface speed of the rubber surfaced roll was approximately 35 percent greater than that of the roll carrying the carding wire surface. The machine direction length of the fabric was decreased by 15 percent. The rolls of the machine were adjusted so that the outermost portion of the wires of the card wire roll lightly touched the surface of rubber surface roll. The fabric was heated at the face surface for approximately 4 to 5 seconds by contact with a close-fitted curbed aluminum shoe heated to 390°F. before the fabric was released from the last roll with the card wire surface.

The fabric was lightly sanded on the back face to even the thickness of the fabric, and immediately passed to a travelling belt press. A portion of the top belt was heated to 460°F so that the fabric passing between the top and bottom belts was in contact with the 460°F heated portion of the belt for only about 6 seconds. The face surface of the fabric contacted the top heated belt. Latter portions of both the top and bottom belts were cooled by circulating cooling water through a flat heat exchanger over which the belts passed and these latter portions of the belts were maintained at temperatures below about 200°F. Before releasing the pressure on the fabric exerted by the belts, the fabric was cooled to below 200°F. The pressure on the belts contacting the fabric was 60 psi.

The fabric, after passing through the belt press, had a thickness of about 66 mils and a weight of about 14 ounces per square yard, i.e., a density of about 17 pounds per cubic foot.

The fabric was impregnated with a natural rubber latex having the following compositions:

|  | Parts by Weight |
|---|---|
| A-Component | |
| Natural rubber latex-(Lotol GX-3289 Uniroyal Chemical) | 100 |
| Water | 34 |
| Sodium polyacrylate water soluble latex thickener (Acrysol ASE 60 Rohm & Haas) | 0.34 |
| Ammonium Hydroxide | to adjust ph to 8.0 |
| B-Component | |
| Water | 4.91 |
| Potassium oleate | 2.77 |
| Ammonium Chloride (20% with ammonia added to pH 10) | 0.96 |
| Zinc Mercaptobenzothiazide (Uniroyal NX-503-C, OXAF) | 1.09 |
| Sulfur (in dispersion form - Uniroyal NX-762-B) | 1.09 |
| Zinc Oxide (in dispersion form - Uniroyal NX-935) | 1.04 |
| Zinc dibutyldithiocarbamate (Uniroyal Butazate-50-D) | 0.58 |
| Aqueous carbon black pigment dispersion at 30% solids) | 2.84 |
| Components A and B are mixed at 3 parts A to 1 part B. | |

The fabric was immersed in the impregnant composition and then squeezed lightly to produce a weight add-on of approximately 150 percent.

The impregnated fabric was passed immediately into a steam chamber maintained at atmospheric pressure and containing steam superheated to about 218°F. The fabric remained in the chamber for about 10 minutes with minimum contact of the fabric with the surfaces of the chamber. The solids of the impregnated composition were coagulated and cured during this steam treatment.

The fabric was then passed out of the steam chamber and dried at temperatures less than 250°F.

The back surface of the fabric was lightly sanded with 180-grit abrasive paper to remove about 2 mils of material from the back surface. The face surface was sanded with the same paper in a belt sander to remove up to about 5 mils from the face surface and produce the upstanding fiber surface.

A viscous urethane prepolymer was applied to the face surface of the fabric with a thin flexible steel doctor blade having a square tip with rounded edges and inclined at 80° from the horizontal in the direction opposite to the movement of the fabric. The thin blade was 0.032 inch thick and extended beyond the jig holding the blade. The blade had a pressure of 2 ½ pounds per linear inch thereon, applied by a pneumatic cylinder with 15 p.s.i.g. pressure. The urethane prepolymer composition had the following formula.

|  | Parts by Weight |
|---|---|
| Prepolymer of polytetramethylene-ether glycol (MW 1000) and tolylene-2, 4-diisocyanate* | 100 |
| Phenyl diisocyanate | 22 |
| Trichloroethylene | 30 |

*The Adiprene L series produced by E. I. du Pont and the Daltoflex A-40 series produced by ICI America are urethane rubber prepolymers and are equivalents for the present purposes.

The fabric with the prepolymer thereon was dried under infrared lamps in a dryer. The amount of dried prepolymer on the fabric was about 1.3 grams per square foot.

The fabric was then allowed to lag at room temperature for about three hours until the urethane prepolymer cured to approximately 30 percent of the maximum potential cure (cross-linking) and then plated in a belt press with the top belt heated to 400°F and pressed at 20 pounds per square inch for 8 seconds.

A base color finish was sprayed onto the fabric surface using an atomizing nozzle with a pressure of 45 pounds per square inch. The base color finish had the following formula:

|  | Parts by Weight |
| --- | --- |
| Primal Ochre (pigment) | 15 |
| Primal White 264 (pigment) | 9 |
| Primal Red (pigment) | 1 |
| Water | 38.5 |
| Flexible unplasticized emulsion of 74/20/3/3 copolymer of ethyl acrylate, methyl acrylate, methylol acrylamide and methacrylic acid** | 36.5 |

**Primal 510, Rohm & Haas Co. is equivalent for purposes of the present invention.

The base color finish was then dried under infrared heaters (temperatures less than 200°F on base finish) to provide a dried finish of about 0.8 gram per square foot.

The fabric was then embossed at 345°F for 15 seconds using a Sheridan Batch Press with a pressure of about 500 pounds per square inch. The top platen was grained to resemble leather and the bottom platen was flat. The embossing step reduced the thickness of the fabric about 10 percent and produced a leather grained surface texture. Two additional color coats of the above-described finish, providing an additional 0.8 gram per square foot of base color coat, was applied to the surface and dried as above discussed.

A top finish coat was then sprayed on the fabric. The spraying was accomplished with an atomizing spray nozzle using 45 p.s.i. pressure. The spray was inclined at an angle to the fabric of about 30° in order to highlight the embossed surface texture. The top finish coat was dried under infrared heaters (temperatures of finish coat of less than 200°F) to produce a dried coating of about 0.3 gram per square foot. The formula of the top finish coat was as follows:

|  | Parts by Weight |
| --- | --- |
| Nitrocellulose lacquer | 50.0 |
| Methyl ethyl ketone | 15.0 |
| Di-isobutyl ketone | 30.0 |
| Carbon black | 5 |

The fabric was then fully cured at 330°F for 2 minutes in a tunnel drier.

The back surface of the fabric was sprayed with a solution of a leather softener of the following formula:

|  |  |
| --- | --- |
| Sulfonated animal and vegetable fat, 2½% – 5% SO₃ content | 12 |
| Water | 88 |

The leather softener was applied in an amount of about 3 grams per square foot. The leather softener improves the hand of the fabric, in terms of leather, and also provides a leather odor to the fabric.

The fabric was mechanically softened by boarding in a conventional leather boarding machine with the face surface contacting the rolls of the boarding machine.

The resulting product was supple, having the feel, grainy appearance, color and texture of leather. The density of the material was approximately 35 pounds per cubic foot. The bending break had 18 wrinkles per inch indicating the flex axis very near the face surface. The bulk density gradient from the back surface to the face surface was approximately 1:2.5. The product with this type of finish had a SATRA standard moisture transmission of 1.6 mg/sq. ft./sec. (natural leather has 1.0–3.0 and CORFAM has 0.5 to 1.5). The material was fabricated into a number of pairs of shoes (shoe uppers), in the same manner as leather and wear tests showed that material was at least equal to leather in foot comfort and durability provided by the shoe uppers. With minimum polymer in the surface matrix and with less total amounts of finishes and color coats, however, moisture transmissions of up to 2.5 can readily be obtained with the present products.

EXAMPLE 2

The process of Example 1 was reppeated except that the bottom platen of the press carried a felted mat of wool fibers. After wetting the felted mat with water, the heated embossing plate was pressed into the mat to produce, on cooling of the mat, a permanently shaped female image of the male graining plate. When using this apparatus, the embossed fabric was reduced in thickness only about 5 percent.

EXAMPLE 3

The process of Example 1 was repeated except that the urethane composition had added thereto 5 parts of a melamine formaldehyde resin, Cymel 301 (American Cyanamid Co.) which increased the rate at which the curing of the urethane takes place when the product is heated. The belt pressing step was eliminated and the embossing step only was used to form the surface matrix and grained surface. The base color coat and top finish coat were subsequently applied to the so-formed matrix surface and produced a slightly tougher surface matrix.

EXAMPLE 4

The process of Example 3 was repeated except that the urethane composition had added thereto 15 parts of polyester resin Daltarol PR-1 (ICI America) which is thermoplastic in character and assists in obtaining a sharper reproduction of the embossing plate during the pressing step.

EXAMPLE 5

The process of Example 4 was repeated except that the embossed fabric was subsequently treated by applying a blend of conventional natural plant and bark tannin extracts to the back surface of the fabric and then allowing the fabric to dry at room temperature. The tannin extract used was a tara extract (31.59% tannin; non-tannins 15.14%; unsolubles 0.55%; and water 52.7%) having a pH of 3.25 and a specific gravity of 1.2325. The dried fabric had a smell similar to tanned natural leather. However, any combination of conventional natural plant and bark tannins may be used in this regard, e.g. Quebracho, Wattle, Chestnut, Sumac and Oak.

EXAMPLE 6

As a comparison instead of using a blade for applying the polymer to the surface of the fabric, the fabric of Example 1 was sprayed with a conventional leather acrylic water-emulsion finish (74/20/3/3 copolymer of ethyl acrylate, methyl acrylate, methylol acrylamide and methacrylic acid, viscosity about 6 cp) by using a series of horizontally revolving atomizing spray nozzles at 45 psi. The amount sprayed was just enough to obtain an even distribution of the polymer, but that amounted to about 9 grams per square foot. The sprayed fabric was heated in a quartz heater oven maintained at about 350°F to quickly set the copolymer on the fabric and evaporate the water. Thereafter the fabric was processed in the same manner as that of Example 1. The fabric had a thicker surface matrix than that of Example 1 and the fibers of the surface matrix was not as tightly adhered into the surface matrix. In general, the product was distinctly inferior to the product of Example 1 but, nevertheless, adequate for non-critical uses of the artifical leather.

Figure 11:
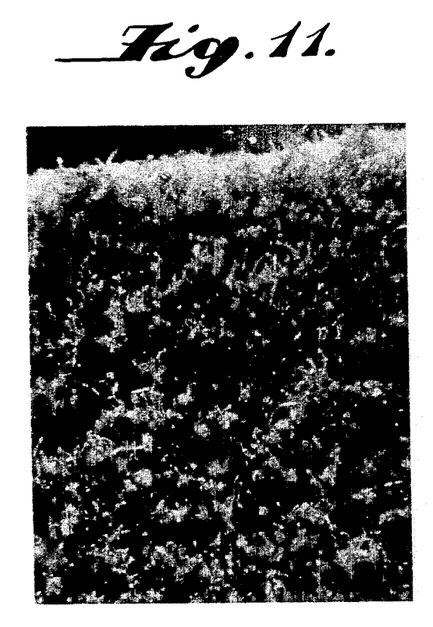
FIGS. 11 through 14 are photomicrographs of the fabric in various stages of the process.

The significance of the process steps and the functions performed can be better understood by reference to the photomicrographs of FIGS. 11 through 14 which illustrate the fabric during processing and the product of the foregoing Examples. FIG. 11 shows the surface of the cut fabric (sanded fabric) after the urethane prepolymer has been placed thereon and the fabric has been contacted with the thin blade. Note the very large number of upstanding fibers which are rooted in the body of the fabric. The number of upstanding fibers, as shown in the photomicrograph is approximately 5,500 per square centimeter. In this regard, the fabric should have at least 2,000 upstanding fibers per square centimeter, and preferably at least 4,000. The upper number of upstanding fibers is not critical but is essentially limited by the fiber density in the body of fabric being cut. Thus, the number of upstanding fibers can be as great as 10,000 to 15,000 per square centimeter or more but generally the number will be about 8,000 or less. A preferred range is 5,00–6,000. Alto note the disposition of the urethane prepolymer composition on the upstanding fibers. FIG. 11 shows a 75× enlargement.

Figure 12:
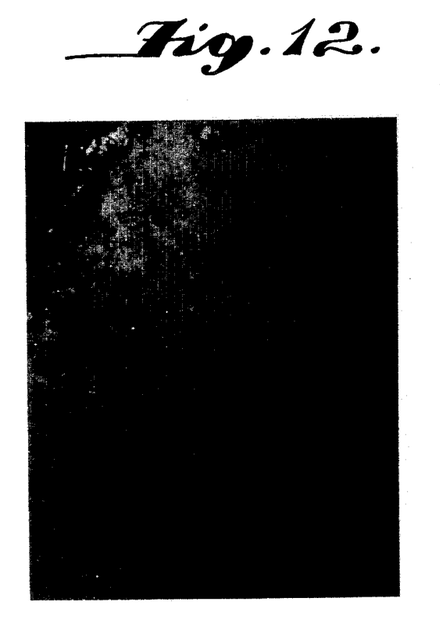

FIG. 12 shows the surface after it has been heated and pressed in a blet press according to the procedure of Example 1. The polymer of the surface matrix is only partially cured at this stage. Again the enlargement is 75×. Note the predominantely fibrous character of the surface matrix.

Figure 13:
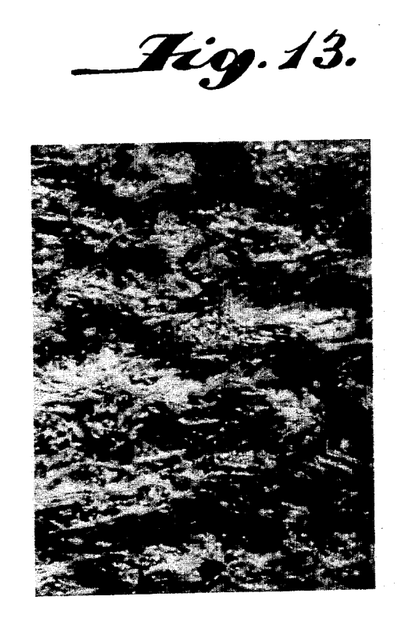

FIG. 13 is a higher enlargement electron photomicrograph showing the details of the surface matrix formed by embossing as in Example 2 to provide graining of the surface. When the surface matrix is formed by pressing with an embossing plate rather than with a smooth plate both the face surface of the fabric and the surface matrix will have "hills" and "valleys" corresponding to the surface of the embossing plate. The face surface of the fabric and the surface matrix will be substantially parallel to each other and generally parallel to the body of the fabric.

Figure 14:
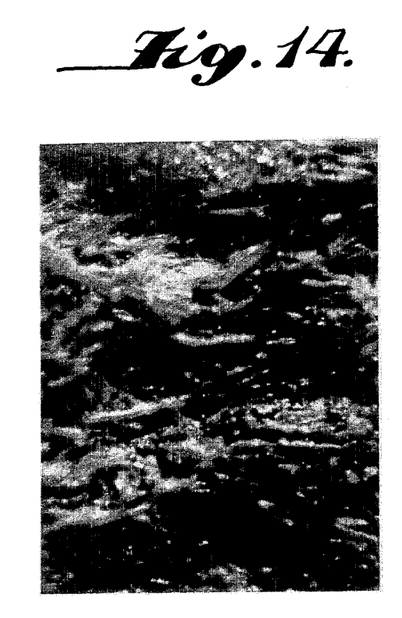

FIG. 14 is even a higher enlargement of the grained surface matrix of FIG. 13 and clearly illustrates the predominately fibrous character of the surface matrix and the manner in which the upstanding fibers have been packed together with ramdom orientation in the plane of the fabric and bonded into a fiber/polymer matrix. It will be understood that during the pressing or embossing step the upstanding surface fibers (i.e. those extending outward from and generally normal to the body of the fabric) are packed together in a plane substantially parallel to the face surface of the fabric. Although the direction of the fibers in these planes will be random, the high pressures employed in this processing step and the absence of excess bonding polymers will assure that these fibers will be closely packed; that is, a majority of the so oriented fibers will be essentially in contact with other fibers at least at cross over points and thus will form a fiber network wherein the size of the polymer linkages bonding the fibers together at cross over points will be at least comparable to the diameter of the fibers. Normally, a majority of segments of individual fibers will cross over the segment of at least one other individual fiber, e.g. at least 75 percent of the fibers cross over. Thus, the surface matrix is predominately fibrous in character.

It can be appreciated that the surface matrix is extremely thin, as opposed to the skins of conventional artificial leather. Thus, the surface matrix is generally of a thickness equal to or less than the combined thickness of 10 individual fibers, more often less than 6 fibers and usually about 3 fibers. This means that, generally, the surface matrix has an average thickness of less than about 0.007 inch and preferably less than 0.005 inch. A usual average thickness is from 0.001 to 0.003 inch. The surface matrix produced by Example 1 is porous, as demonstrated by the SATRA test and is not a film but a bonded fibrous structure as shown in FIGS. 13 and 14.

With regard to the quantity of polymer disposed in the fiber/polymer surface matrix, it will be appreciated from the previous discussion that although the upstanding surface fibers are pressed into a closely packed network arrangement, the volume of voids between fibers in the matrix layer will be substantial. Even in the most dense textile fibrous materials void volume will be about 50 percent. In the present case the percent void will be greater due to random orientation and cross over points. The desirable properties of the surface matrix will be realized so long as the closely packed random surface fiber network is provided and the fibers in this network are securely bonded by short bond linkages. Thus, the minimum amount of the polymer would be the amount required to bond the fiber network while the maximum which might be present would be an amount sufficient to bond the fibers and additionally to fill the voids in this closely packed fiber network. On a weight basis the polymer of the surface matrix expressed as a percentage of the fibers plus the polymer in the surface matrix will usually be less than 95 percent, e.g. usually less than 75 or even 50 percent. However, on the same basis, the polymer will usually constitute at least 10 percent, e.g. at least 25 or even 35 percent.

As can be seen from the above, the product of the invention is a textile fabric which may consist essentially of textile fibers forming a body and face surface of the fabric. The face surface has a plurality of individual surface fibers and segments of a plurality of the individual fibers are contained in a surface matrix. In other words, at least one segment of an individual fiber is anchored and bound in the body of the fabric and at least one other segment of that same individual fiber is contained in the surface matrix. Of course, a plurality of such individual fibers are so disposed which produces a plurality of segments of fibers in the body of the fabric and in the surface matrix. This plurality of segments is substantially parallel to the overall plane of the surface matrix and hence to the surface of the fabric. The segments of individual fibers in the surface matrix are closely packed together and in random arrangement so that the fibers cross over other fibers but the fibers lie in planes substantially parallel to the plane of the surface matrix. Other segments of the individual fibers, essentially all of the remaining segments not in the surface matrix, are rooted and bound in the body of the fabric. The segments of the fibers in the surface matrix are bonded together, at least at cross over points, by a polymeric resin which is disposed essentially only in the surface matrix, in the manner discussed above. By this arrangement of fibers and polymer, the surface matrix and hence the fabric, has a predominately fibrous appearance or character.

The upstanding surface fibers may be cut fibers, produced by sanding or buffing the fabric surface and this is a preferred embodiment. However, the fabric surface may be prepared by any desired method, so long as the multitude of upstanding fibers is produced. For example, a knitted fabric may be sufficiently brushed to pull loops of fibers from the fabric and produce the number of upstanding fiber segments required (each loop would be equivalent to two cut fiber segments). Alternately, a woven fabric with relatively highly crimped yarns may be brushed to produce loops of the required number of upstanding fibers. Similarly, the knitted or woven fabric may be cut by sanding or buffing, as discussed above in connection with the needled fabric. It should be appreciated, therefore, that the important point involving the upstanding fibers (either cut or in loops) is that they significantly extend from the surface of the body of the fabric, are firmly rooted and bound in the body of the fabric and are sufficiently independent of each other (by cutting, buffing, brushing, etc) that they can be randomly arranged and bonded in the pressing step to form the matrix. If the fibers do not sufficiently protrude from the surface of the body of the fabric, no significant fiber network and hence fiber/polymer matrix will result and the scuff-resistant surface of the artificial leather will not be provided. Thus, the average upstanding fiber must extend from the surface of the fabric for a distance at least equal to the intended average thickness of the surface matrix, e.g. 1½ to 2 times the average intended thickness and up to 10 to 15 times the average intended thickness. On the other hand, the upstanding fibers must not excessively protrude from the surface of the fabric. Generally, for most fabrics, the upstanding fibers (or loops) should not extend out of the surface of the body of the fabric more than 40 mils and preferably less than 20 mils, e.g. less than 15 or 10 mils. The fibers should extend sufficiently from the surface so that the fibers may be pressed and thus closely packed in a plane essentially parallel to the face surface of the fabric to form the entwined fiber network wherein the fibers are bonded together to give the present fibrous surface matrix. Accordingly, the fibers should extend from the surface of the body of the fabric by at least the thickness of the final surface matrix, as noted above, and preferably at least 5 mils, e.g. 7 mils. The preferred fabric is the needled fabric of the parent application, as discussed hereinbefore. In this case it is preferred that the overall bulk density of the fabric be at least 8 pounds per cubic foot and preferably at least 12 pounds per cubic foot and have the previously described shifted axis of flexure. When such a fabric is buffed or sanded, as disclosed in the parent application, the resulting surface, inherently, has the present required multitude of relatively short upstanding fibers.

It should be understood that the fibers contained in the surface matrix may be highly convoluted and may actually pass out of the surface matrix, into the body of the fabric and back into the surface matrix, and so forth. Thus, any one individual fiber may have more than one segment in the surface matrix. This will be particularly true when the face surface is a looped fiber surface as opposed to a cut fiber surface, as discussed above. In view thereof, it should also be understood that many fibers in the surface matrix will not be substantially parallel to the face surface and that this description of the fiber disposition in the surface matrix refers to the average or overall orientation of the fiber segments as a whole. In the same manner, it should be understood that the description of fibers crossing over other fibers and yet lying in planes substantially parallel to the plane of the surface matrix is made with the reservation that this refers to the average or overall orientation of the fiber segments as a whole and is not intended to require every individual fiber to be so accurately disposed. Likewise, the description of all other portions of the fiber segments being in the body of the fabric is not intended to mean that some small amount of fiber segments cannot protrude out of the top of the surface matrix. Thus, for purposes of the present specification the descriptions of the dispositions of fibers, polymeric resin, filler, etc. are intended to reference the predominate dispositions, orientations, shapes, etc.

In view of the different nature of the present fabric, the artificial leathers of the invention are not at all similar to conventional "poromerics" and the present artificial leathers can not be accurately classified by conventional terminology. Thus, in view of the dense, intensely entangled, fiber network, the present products are more accurately described as "reticular" shoe upper materials.

What is claimed is:

1. A fabric comprising textile fibers forming a body of a needled fabric, a face surface on the body of the fabric having surface fibers and segments of a plurality of individual fibers contained in a surface matrix, the surface matrix being disposed on the face surface and being substantially parallel thereto, the segments of the individual fibers in the surface matrix being closely packed together and in random arrangement so that fibers cross over other fibers but the fibers are in planes substantially parallel to the plane of the surface matrix, other segments of the individual fibers being rooted and bound in the body of the fabric, the segments of the fibers contained in the surface matrix being bonded together, at least at cross-over points, by a polymeric resin which is disposed essentially only in the surface matrix and the amount of the polymeric resin being such that the surface matrix has a predominately fibrous character, and wherein the body of the textile fabric is characterized by highly entangled fibers and an overall bulk density of at least 8 pounds per cutic foot.

2. The fabric of claim 1 wherein the segments of the individual fibers and the polymeric resin are fused into the surface matrix.

3. The fabric of claim 2 wherein the fusion is heat fusion.

4. The fabric of claim 3 wherein the polymeric resin is cured.

5. The fabric of claim 4 wherein the resin has become further polymerized or cross linked.

6. The fabric of claim 1 wherein the surface matrix has a pattern embossed therein.

7. The fabric of claim 6 wherein a finish is on the surface matrix.

8. The fabric of claim 7 wherein the finish is a leather finish.

9. The fabric of claim 1 wherein the surface fibers are at least in part cut fibers.

10. The fabric of claim 9 wherein the polymeric resin is at least in part disposed in and around the surface of the cut fibers.

11. The fabric of claim 10 wherein the cut fibers are pressed into the surface matrix.

12. The fabric of claim 1 wherein the length of the segments of the fibers in the surface matrix is at least equal to the thickness of the surface matrix.

13. The fabric of claim 12 wherein the said length is at least one and one-half time the thickness of the surface matrix.

14. The fabric of claim 13 wherein the said length is at least two times the thickness of the surface matrix.

15. The fabric of claim 1 wherein these are at least 2,000 segments of individual fibers per square centimeter in the surface matrix.

16. The fabric of claim 15 wherein the surface matrix has a thickness no greater than that equal to the thickness of ten fiber diameters contained in the surface matrix.

17. The fabric of claim 1 wherein these are at least 4,000 segments of individual fibers per square centimeter in the surface matrix.

18. The fabric of claim 17 wherein the surface matrix has a thickness no greater than that equal to the thickness of six fibers diameters contained in the surface matrix.

19. The fabric of claim 1 wherein the majority of the segments of individual fibers cross over the segment of at least one other individual fiber.

20. The fabric of claim 19 wherein at least 75 percent of the segments of individual fibers cross over the segment of at least one other individual fiber.

21. The fabric of claim 1 wherein the fabric has a bulk density gradient in which the bulk density increases from the back surface to the face surface.

22. The fabric of claim 21 wherein the fabric has an axis of flexure which lies within about 0.3 of the distance from the face surface to the back surface.

23. The fabric of claim 1 wherein the body of the fabric has fibers which are oriented into closely spaced rows of fiber chain entanglement.

24. The fabric of claim 1 wherein the overall bulk density of the fabric is at least 8 pounds per cubic foot.

25. The fabric of claim 1 wherein the overall bulk density of the structure is at least 12 pounds per cubic foot.

26. The fabric of claim 1 wherein the fabric has open interstices between the fibers in the body of the fabric and the interstices have a filler impregnated therein.

27. The fabric of claim 26 wherein the filler is an elastomer in the form of solid particles.

28. The fabric of claim 27 wherein the elastomer particles are in clusters of particles which are predominantly loosely bonded to the fibers of the fabric.

29. The fabric of claim 28 wherein the impregnated elastomer is in an amount sufficient to fill all of the interstices between the fibers of the structure.

30. The fabric of claim 29 wherein the bulk density of said fabric is between 20 and 45 pounds per cubic foot.

31. A method for producing a fabric with a fiber/polymer matrix disposed essentially only on a surface of the body of the fabric comprising:
  a. providing a needled textile fabric having a face surface with a plurality of upper surface fibers and individual fibers wherein a relatively short segment of the individual fibers protrudes and upstands from the body of the fabric, and another segment of the individual fibers is rooted and bound in the body of the fabric;
  b. causing relating movement between the fabric and a blade in contact with the surface of the fabric;
  c. applying a viscous liquid with a viscosity of at least 2,000 cp to the surface of the fabric prior to the point of contact between the surface of the fabric and the blade;
  d. applying a pressure to the surface of the fabric by the blade wherein the pressure is at least ½ pound per linear inch of the length of the blade and sufficient that the upstanding fibers are mechanically worked and the pressure action of the blade is sufficiently close in time to the application of the viscous liquid as to not allow the viscous liquid to essentially pass through the upstanding fibers and surface fibers and penetrate into the body of the fabric and the viscous liquid is caused to essentially only coat surfaces of the upstanding fibers and surfaces of the upper surface fibers and excess liqiud is removed from the fabric;
  e. adjusting the point of application of the viscous liquid to the fabric and the rate of movement of the fabric whereby the viscous liquid does not substantially penetrate into the body of the fabric; and
  f. setting the viscous liquid while pressing the face surface;

and wherein the body of the textile fabric is characterized by highly entangled fibers and an overall bulk density of at least 8 pounds per cubic foot.

32. The method of claim 31 wherein the said surface is provided by cutting the textile fabric.

33. The method of claim 32 wherein the cutting is substantially parallel to the surface of the textile fabric.

34. The method of claim 33 wherein the surface is sanded.

35. The method of claim 31 wherein the body of the textile fabric has an overall bulk density of at least 12 lbs. per cubic foot.

36. The method of claim 31 wherein the viscous liquid contains a curable resin.

37. The method of claim 31 wherein the pressure between the blade and the fabric is up to 10 pounds per linear inch of the length of the blade.

38. The method of claim 31 wherein the blade is also moved in a direction substantially transverse to the direction of movement of the fabric.

39. The method of claim 31 wherein a plurality of blades are used.

40. The method of claim 31 wherein a pool of liquid is maintained on the fabric at a depth sufficient to at least inundate the contact tip of the blade.

41. The method fo claim 31 wherein a resilient pressure support is disposed next to the side of the fabric which is not contacted by the tip of the blade.

42. The method of claim 31 wherein the textile fabric is characterized by, coherent fiber entanglement, and a controlled axis of flexure and with a face surface and a back surface, said structure having an overall bulk density of at least 8 pounds per cubic foot and a bulk density gradient in which the bulk density increases from the back surface to the face surface and the axis of flexure of the structure lies within about 0.3 of the distance from the face surface to the back surface.

43. The method of claim 31 wherein the coherent fiber entanglement of said structure includes orienting some of the fibers into closely spaced rows of fiber chain entanglement, the rows extending lengthwise of the structure.

44. The method of claim 31 wherein the overall bulk density of the structure is at least 12 pounds per cubic foot.

45. The method of claim 31 wherein the textile fabric has open interstices between the fibers and the interstices have a filler impregnated therein.

46. The method of claim 45 wherein the filler is an elastomer in the form of solid particles.

47. The method of claim 46 wherein the elastomer particles are in clusters of particles which are predominantly loosely bonded to the fibers of the fabric.

48. The method of claim 49 wherein the impregnated elastomer is in an amount insufficient to fill all of the interstices between the fibers of the fabric.

49. The method of claim 48 wherein the bulk density of said fabric is between 20 and 45 pounds per cubic foot.

50. A method for producing a needled fabric with a fiber/polymer matrix disposed essentially only on the surface of the body of the fabric comprising providing a needled fabric having a face surface with a plurality of fibers wherein a relatively short segment of individual fibers protrudes and upstands from the body of the fabric and another segment of the individual fibers is rooted and bound in the body of the fabric, applying a polymeric liquid to the face surface of the fabric so that the liquid coats surfaces of the upstanding fibers but does not substantially penetrate into the body of the fabric and setting the polymeric liquid while pressing the face surface and wherein the body of the textile fabric is characterized by highly entangled fibers and an overall bulk density of at least 8 pounds per cubic foot.

* * * * *